US011067263B2

(12) United States Patent
Chatten et al.

(10) Patent No.: US 11,067,263 B2
(45) Date of Patent: Jul. 20, 2021

(54) PIVOT DEVICE FOR A NAVIGATION LIGHT

(71) Applicant: Pro Access Systems, Inc., Elburn, IL (US)

(72) Inventors: Andrew F. Chatten, Elburn, IL (US); Ted J. Fiock, Elburn, IL (US)

(73) Assignee: FENCING SUPPLY GROUP ACQUISITION, LLC, Dunwoody, GA (US)

( * ) Notice: Subject to any disclaimer, the term of this patent is extended or adjusted under 35 U.S.C. 154(b) by 3 days.

(21) Appl. No.: 16/658,639

(22) Filed: Oct. 21, 2019

(65) Prior Publication Data

US 2020/0124257 A1 Apr. 23, 2020

Related U.S. Application Data

(60) Provisional application No. 62/748,496, filed on Oct. 21, 2018.

(51) Int. Cl.
| | |
|---|---|
| *F21V 21/26* | (2006.01) |
| *F16M 11/10* | (2006.01) |
| *F16M 11/18* | (2006.01) |
| *F16H 19/08* | (2006.01) |
| *F21W 111/04* | (2006.01) |

(Continued)

(52) U.S. Cl.
CPC ............ *F21V 21/26* (2013.01); *F16H 19/08* (2013.01); *F16M 11/105* (2013.01); *F16M 11/18* (2013.01); *F16M 2200/021* (2013.01); *F16M 2200/024* (2013.01); *F16M 2200/041* (2013.01); *F21W 2111/04* (2013.01); *G08B 5/36* (2013.01); *G08G 3/02* (2013.01)

(58) Field of Classification Search
CPC ....... F21V 21/26; F16H 19/08; F16M 11/105; F16M 11/18; F16M 2200/021; F16M 2200/024; F16M 2200/041; F21W 2111/04; G08B 5/36; G08G 3/02
See application file for complete search history.

(56) References Cited

U.S. PATENT DOCUMENTS 6,164,803 A * 12/2000 Reniger ............... B60Q 1/2657
114/353
7,267,516 B1 * 9/2007 Sorensen .................. B66F 9/16
414/23

(Continued)

FOREIGN PATENT DOCUMENTS

CN 207414581 U * 5/2018
CN 110100201 A * 8/2019 ............... A45F 5/02

(Continued)

*Primary Examiner* — Mary Ellen Bowman
(74) *Attorney, Agent, or Firm* — Thomas | Horstemeyer, LLP

(57) ABSTRACT

A device for pivoting a navigation light and methods that use the device can include a mount assembly with an attachment for attaching the device to a structure. A pivot assembly can be supported by the mount assembly, with the pivot assembly configured to pivot the navigation light to one or more operating, service, or hold positions. A brake pin with an end sized and shaped to fit within an indentation of a disc of the pivot assembly can secure the pivot assembly against rotation when the second end is accommodated by the indentation.

20 Claims, 9 Drawing Sheets

(51) Int. Cl.
    *G08B 5/36*       (2006.01)
    *G08G 3/02*       (2006.01)

(56) References Cited

U.S. PATENT DOCUMENTS

| | | | | |
|---|---|---|---|---|
| 8,757,851 | B1 * | 6/2014 | Clemons | B63H 20/32 |
| | | | | 362/377 |
| 2006/0013008 | A1 * | 1/2006 | Yeung | F21V 21/26 |
| | | | | 362/413 |
| 2009/0201689 | A1 * | 8/2009 | Nolle | B60Q 1/24 |
| | | | | 362/485 |
| 2013/0039081 | A1 * | 2/2013 | Czipri | B63B 45/04 |
| | | | | 362/477 |
| 2020/0123723 | A1 * | 4/2020 | Chatten | E01F 9/00 |
| 2020/0124258 | A1 * | 4/2020 | Chatten | F16H 19/08 |

FOREIGN PATENT DOCUMENTS

| | | | | |
|---|---|---|---|---|
| WO | WO-2005022023 A1 * | 3/2005 | | F21L 14/04 |
| WO | WO-2018005186 A1 * | 1/2018 | | B63B 15/00 |

* cited by examiner

PIVOT DEVICE FOR A NAVIGATION LIGHT

CROSS-REFERENCE TO RELATED APPLICATIONS

This application claims the benefit of and priority to U.S. Provisional Patent Application No. 62/748,496 entitled "PIVOT DEVICE FOR A NAVIGATION LIGHT" filed on Oct. 21, 2018, which is expressly incorporated by reference as if fully set forth herein in its entirety.

BACKGROUND

A navigation light is a specific type of light that can be attached to a structure and used as a marine signal light for marking a center channel or channel margin of a waterway. Conventional navigation lights often use a swivel to allow the navigation light to be moved from a normal operating position to a service position in which a light assembly can be serviced or a lamp can be replaced. A retrieval chain attached to the navigation light facilitates an operator to raise and lower the light. Navigation lights can be unwieldy to raise, lower, and secure in position.

SUMMARY

Various embodiments of a device and method for pivoting a navigation light are described. In one embodiment, a device for pivoting a navigation light includes a mount assembly with an attachment for attaching the device to a structure. The device can include a pivot assembly supported by the mount assembly such that the pivot assembly can pivot a navigation light to one or more operating, service, or hold position(s). The pivot assembly can also include a tee that is configured to connect to a navigation light (e.g., sized and shaped to receive and secure the navigation light). In some embodiments, the pivot assembly includes a counterweight that offsets at least a portion of a weight of the navigation light. Applying a force, such as by hand, to the counterweight can pivot the navigation light. The device can be pivoted when an operator pulls on a retrieval chain.

The device can also include a brake assembly with a brake pin that has a first end and a second end distal from the first end, where the pivot assembly includes at least one indentation that can accommodate the second end to secure the pivot assembly against rotation when the second end is accommodated by the at least one indentation. The second end can for example be sized and shaped to fit within the indentation. The brake assembly can also include a lock mechanism with a brake pin retainer that captures the brake pin when locked.

In some examples, the pivot assembly includes several indentations that are equidistantly spaced in a radial pattern. The hold position, or hold positions, can correspond to the several indentations such that the accommodating the second end of the brake pin by one of the indentations can secure the navigation light in a corresponding hold position. The device can also include a brake pin guide configured to align the second end of the brake pin to be received by the at least one indentation. In some aspects, applying an upward force to the first end of the brake pin can remove the second end of the brake pin from the indentation and allow the navigation light to be pivoted to an operating position, a service position, or one or more hold positions.

In other embodiments, a device for pivoting a navigation light includes a mount assembly with a tube and a sleeve. The device includes a pivot assembly with a disc connected to a shaft, where the shaft is supported by the sleeve to allow the shaft to rotate about a rotational center of the disc. The shaft can also connect to a tee having a first end configured to connect to a navigation light and a second end configured to connect to a counterweight. The device also includes a brake assembly with a brake pin that is configured to pass within the tube. A portion of the brake pin emerges from the tube to contact the disc. Applying a substantially upward force to the brake pin can release the brake pin from the contact with the disc. In some examples, the brake pin contacting the disc can secure the navigation light in several positions that are equidistantly spaced in a radial pattern, such as from the center of the disc.

In another embodiment, a method of pivoting a navigation light can include attaching a mount assembly to a structure, and supporting a pivot assembly by the mount assembly. The pivot assembly can be supported and configured to pivot a navigation light to one or more operating, service, or hold position(s). In some examples, the hold position is between 90 degrees and 180 degrees from a horizontal surface of the structure. The pivot assembly can include an indentation for accommodating an end of a brake pin having a first end and a second end distal from the first end. The method can include obtaining a brake pin and lowering the brake pin to secure the pivot assembly against rotation when at least a portion of the brake pin is accommodated by the at least one indentation. The method can also include attaching a counterweight and the navigation light to the pivot assembly. In other aspects, the method can include capturing the brake pin to prevent unwanted pivoting of the navigation light.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

In addition, all optional and preferred features and modifications of the described embodiments are usable in all aspects of the entire disclosure taught herein. Furthermore, the individual features of the dependent claims, as well as all optional and preferred features and modifications of the described embodiments are combinable and interchangeable with one another.

BRIEF DESCRIPTION OF THE DRAWINGS

The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Navigation lights can be attached to a structure and used as a marine signal light for marking a center channel or channel margin of a waterway. A navigation light can include a lamp inside a housing designed to protect the lamp and to provide access so the lamp can be serviced. Lamps and housings can be difficult to service in the operating position due to the navigation light being unwieldy. A swivel can allow an operator to raise and/or lower the navigation light for service, but is not a solution to the problem of easily pivoting a navigation light toward an operating or service position, or securing the navigation light once the position has been reached. In some installations for example, an operator may have to provide more than thirty pounds of force to the retrieval chain to raise and/or lower the navigation light.

The present application relates to a pivot device that can be attached to a structure and used to suspend a navigation light below a platform of the structure. The device provides an alternative to conventional navigation lights, conventional swivels for navigation lights, conventional latches for securing navigation lights, and methods of raising and lowering a navigation light. In contrast to conventional swivels, the device described herein provides a pivot to facilitate raising and lowering a navigation light. The device described herein can be used to allow an operator to easily position a navigation light in various positions, including but not limited to, operating position, service position, and various hold positions. The device can secure the light in position.

Figure 1:
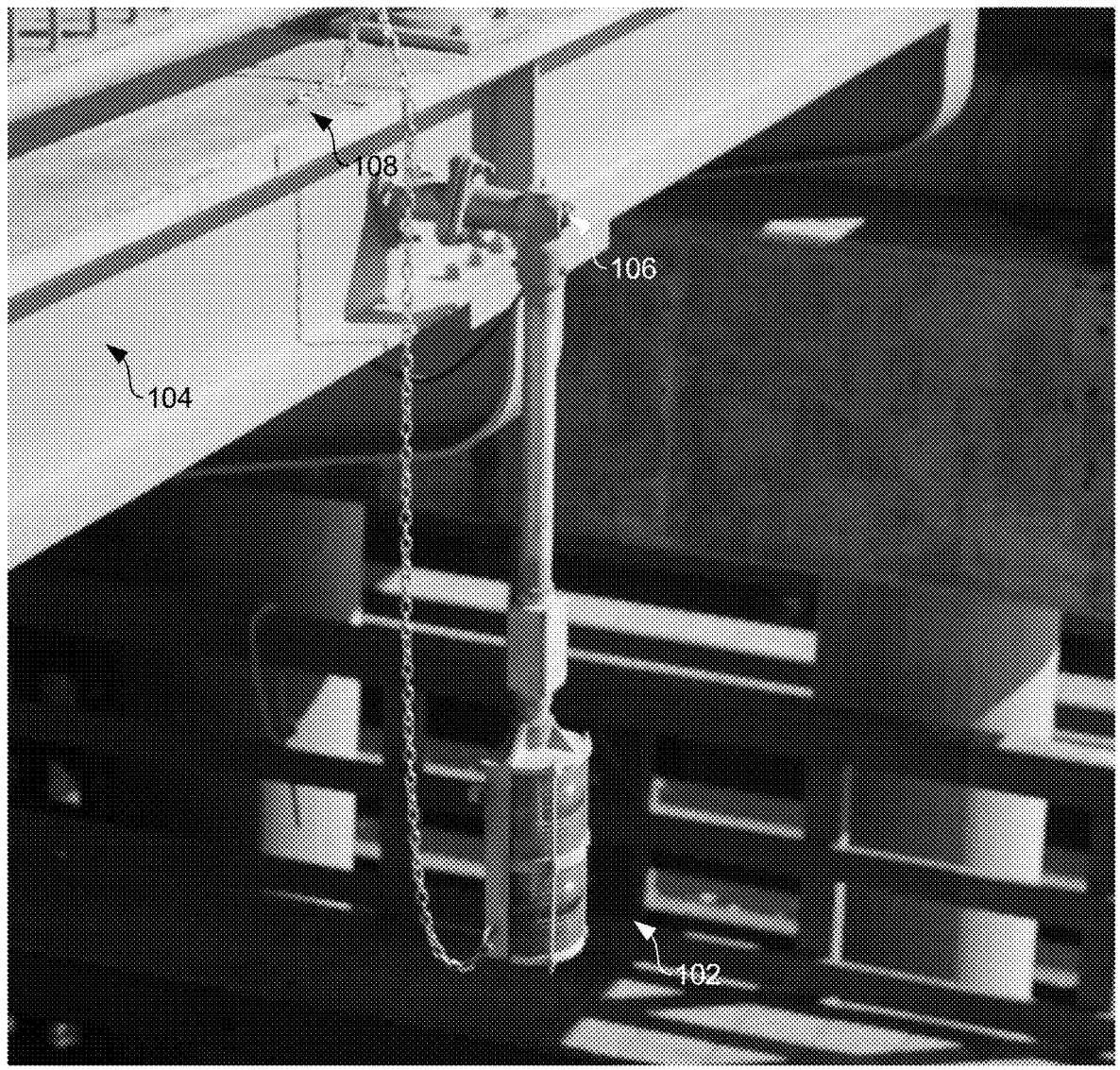
FIG. 1 illustrates problems associated with raising and lowering a navigation light using traditional methods and devices.

Turning to the drawings, FIG. 1 illustrates problems associated with raising and lowering a navigation light using traditional methods and devices. The swing arm assembly 100 includes a lamp fixture 102 that is attached to a structure 104 using a triangular mount, and suspended from a swivel component 106 on a galvanized pipe. The swing arm assembly 100 can include a weather-tight assembly that provides for all wiring to be completely contained inside the assembly. A retrieval chain 108 facilitates raising and lowering the swing arm assembly 100 for service. The retrieval chain 108 depicted is eight feet long.

The swing arm assembly 100 as depicted in FIG. 1 is in an operating position. The swing arm assembly 100 can be moved into a service position, such as to allow the lamp fixture 102 to be maintained or a lamp within the lamp fixture 102 to be replaced. Maintenance and re-lamping can be accomplished from a platform of the structure 104 by an operator pulling on the retrieval chain 108, allowing the lamp fixture 102 to swivel about the swivel component 106. As the lamp fixture 102 is raised, a latch can be manually engaged to hold the lamp fixture 102 in a service position. Such an operation has many problems including that the swing arm assembly 100 can be unwieldy to raise, lower, and secure in position.

Figure 2:
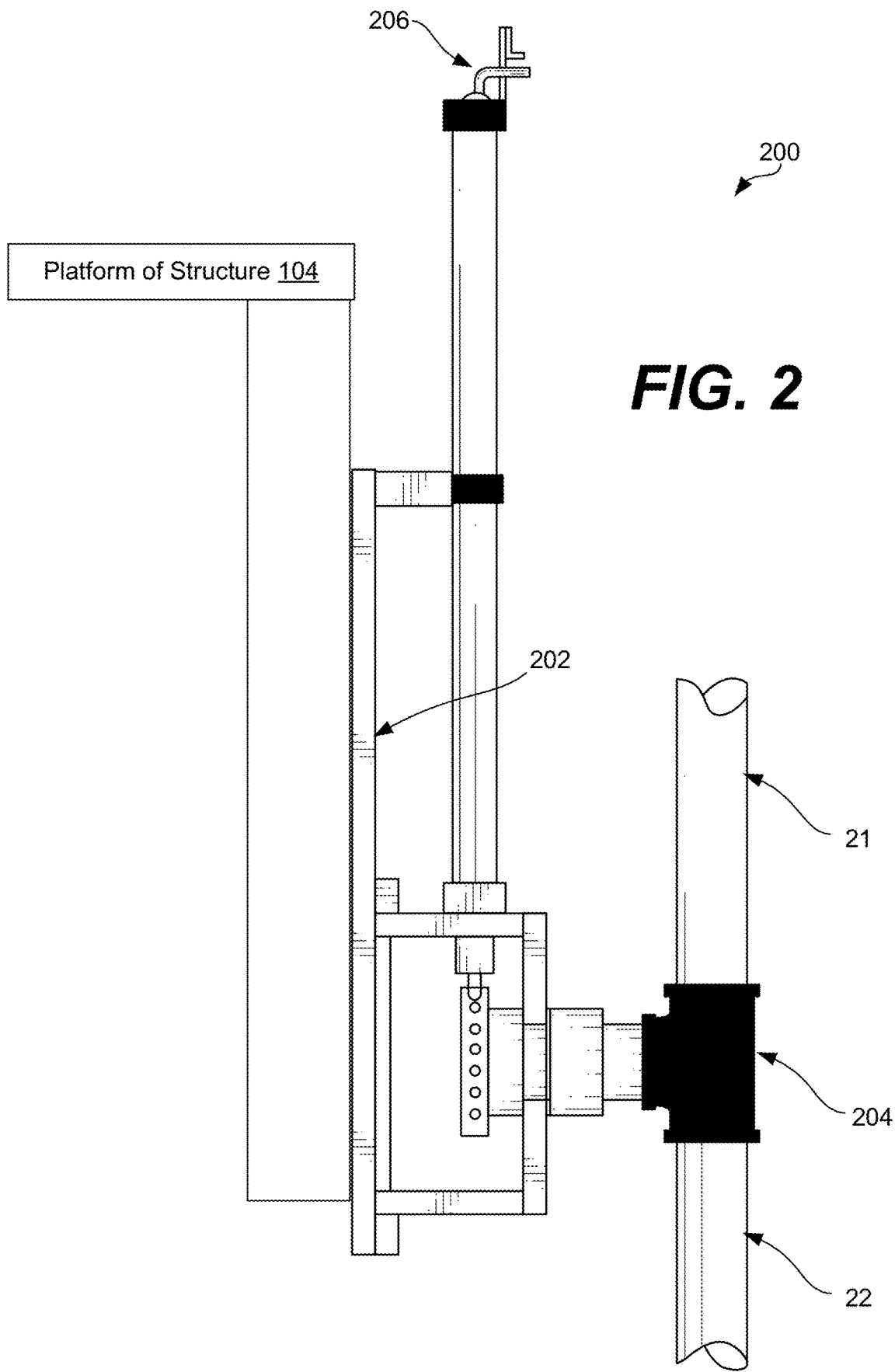
FIG. 2 illustrates an example of a device for pivoting a navigation light, in accordance with various embodiments of the present disclosure.

Turning now to FIG. 2, shown is an example of a device 200 for pivoting a navigation light. As depicted, the example device 200 includes a mount assembly 202, a pivot assembly 204, a brake assembly 206, and other components that will be described in further detail below.

In some embodiments, the mount assembly 202 can include a triangular mount, a standoff element, a mount plate, or other attachment for attaching the device 200 to a bridge or other structure 104. The mount assembly 202 can also include various other components, such as components to enclose, mount, receive, or support members of the pivot assembly 204. Adaptors, shafts, and other members of the pivot assembly 204 can be received and supported by component(s) of the mount assembly 202.

The pivot assembly 204 can include one or more discs, adaptors, gears, or other members that are coaxially aligned and mechanically coupled to rotate about a common rotational center. The pivot assembly 204 can be supported by the mount assembly 202, and configured to pivot a navigation light 22 to one or more operating, service, or hold position(s). The navigation light 22 can include a lamp assembly (not depicted) and a pipe of size and strength to suspend the navigation light 22 away from a rotational center of the pivot assembly 204.

The brake assembly 206 can include a brake pin or other element that can be operated by hand to allow an operator to secure the navigation light 22. The brake assembly 206 can provide a braking force that prevents the navigation light 22 from pivoting. For example, the pivot assembly 204 can include a disc and a tee that are coaxially aligned to rotate about a rotational center of the disc. The brake assembly 206 can include a brake pin having a first end and a second end distal from the first end, with the second end of the brake pin being sized and shaped to fit within an indentation of the disc to secure the pivot assembly 204 against rotation when the second end is accommodated by the indentation.

The pivot assembly 204 is also configured to be connected to the navigation light 22, and in some cases, to be connected to a counterweight 21. With reference to an operating position of the navigation light 22, the device 200 is configured to suspend the navigation light 22 below an outermost edge of the structure 104 so the navigation light 22 is visible to approaching vessels. Applying an upward force to the first end of the brake pin removes the second end from the indentation and allows the navigation light 22 to be pivoted to the one or more operating, service, or hold position(s). An operator can apply an upward force to (or lower) the brake pin from a bridge deck, sidewalk, or other platform of the structure 104.

Figure 3:
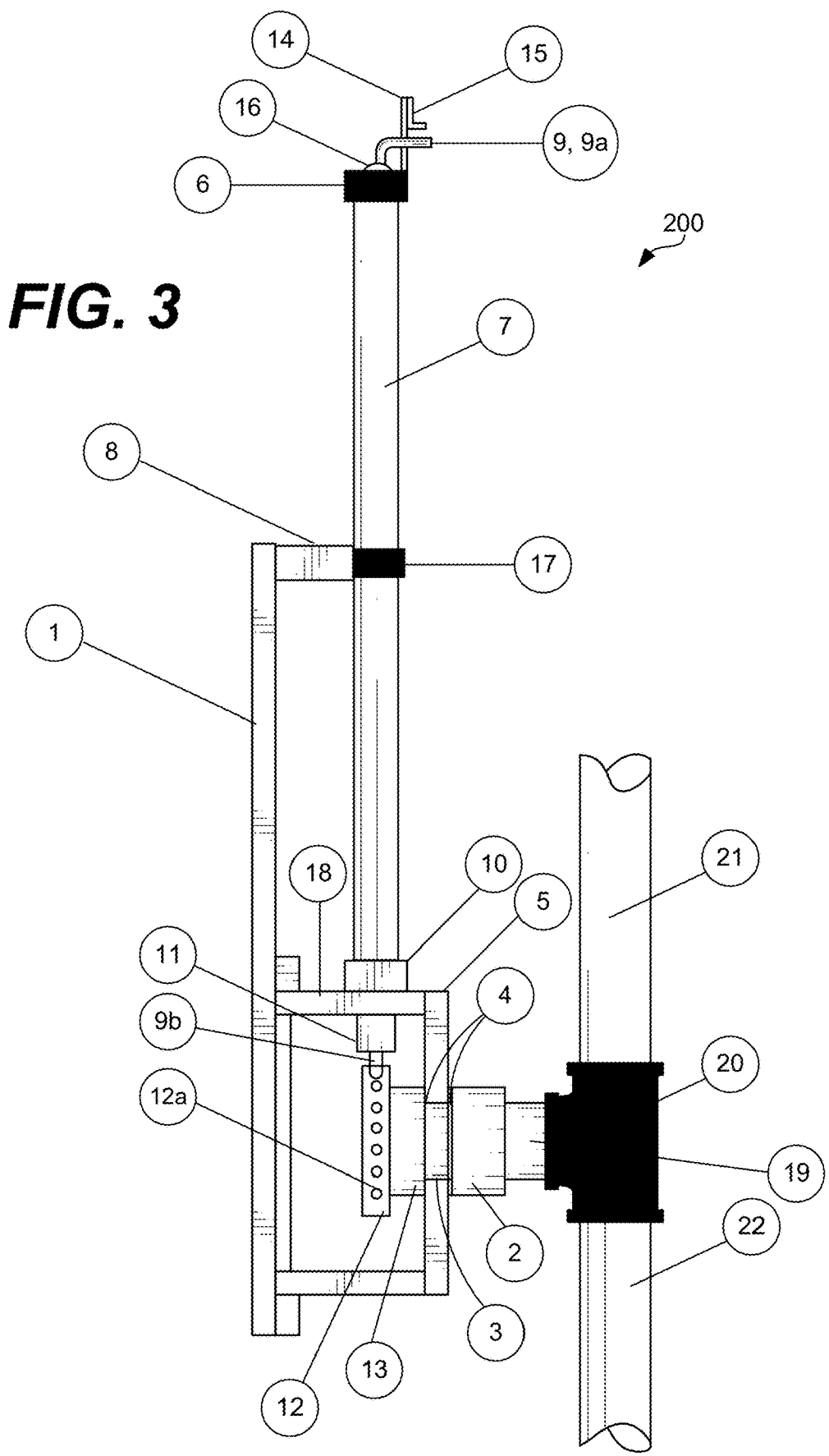
FIG. 3 illustrates an example of a device for pivoting a navigation light, in accordance with various embodiments of the present disclosure.

Moving on, FIG. 3 depicts an example of a device 200 for pivoting a navigation light 22. FIG. 3 can also be seen as depicting further examples of the mount assembly 202, the pivot assembly 204, and the brake assembly 206 of FIG. 2. The mount assembly 202 (FIG. 2) can include a mount plate 1 that can attach the device 200 to a structure 104 (FIG. 2). The mount assembly 202 (FIG. 2) can also include a sleeve bearing 3, thrust bearing 4, cover 5, pipe spacer 8, pipe support 10, pipe strap 17, box 18, and/or other components as further described below.

The pivot assembly 204 (FIG. 2) can include a brake disc 12 and one or more other members that are coaxially aligned and mechanically coupled to rotate about a rotational center of the brake disc 12. The pivot assembly 204 (FIG. 2) can also include an adaptor 2, spacer 13, close nipple 19, tee 20, counterweight 21, a navigation light 22, and/or other components as further described below. While the example device 200 depicted in FIG. 3 includes a counterweight 21 and a navigation light 22, the device 200 can operate without the counterweight 21 (or the navigation light 22) connected to the tee 20. A retrieval chain 108 (FIG. 1) can also be attached to the counterweight 21 to assist with pivoting the navigation light 22. The navigation light 22 can include a lamp assembly and a pipe of size and strength to suspend the navigation light 22 away from a rotational center of the brake disc 12.

The brake assembly 206 (FIG. 2) can include a brake pin 9 or other element that can be operated by hand to allow an operator to secure the navigation light 22. The brake assembly 206 (FIG. 2) can also include a pipe cap 6, brake pipe 7, brake pin guide 11, brake pin retainer 14, lock 15, and seal 16, as further described below. The device 200 can also include various washers, nuts, bolts, screws, bushings, and/or other fasteners as can be appreciated.

As depicted in FIG. 3, the mount plate 1 can secure the device 200 into position such as below a platform of a bridge or other structure 104. A brake disc 12 can be mechanically coupled to the tee 20 so that the tee 20 rotates about a rotational center of the brake disc 12. A counterweight 21 can offset a weight of the navigation light 22. The close nipple 19 and the tee 20 of the pivot assembly 204 rotate to allow the navigation light 22 to pivot toward an operating, service, or hold position. The brake pin 9 can apply a braking force to prevent unwanted rotation of the tee 20.

The pipe spacer 8 is used to provide a space between the brake pipe 7 and the mount plate 1, and is attached to a pipe strap 17 that secures the brake pipe 7 in position. The box 18 is attached to the mount plate 1 to encase components of the pivot assembly 204 or the brake assembly 206. Attached to the box 18, pipe support 10 supports the brake pipe 7 in an orientation with regards to other components as will be described below.

The pipe cap 6 covers the brake pipe 7 while allowing an opening to be maintained that is sufficient to accept a portion of the brake pin 9. As depicted in FIG. 3, the brake pin 9 includes a first end 9a that can be captured by the brake pin retainer 14 and a second end 9b that is distal from the first end 9a. The brake pin guide 11 can guide the second end 9b as will be further described below. The seal 16 is disposed to contact the opening of the brake pipe 7 and the brake pin 9 to protect the opening and the brake pin 9 from weather and unwanted elements. The box 18 can receive the second end 9b of the brake pin 9 through the brake pin guide 11. The box 18 can also include a cover 5 that is removably attached to the box 18 to allow servicing of the components encased within the box 18.

As depicted in FIG. 3, the brake disc 12 is mounted for rotation in a sleeve bearing 3 which is mounted to the cover 5 and between the spacer 13 and the adaptor 2. The first thrust bearing 4 permits rotation between the adaptor 2 and the close nipple 19 and/or the sleeve bearing 3, while supporting a high axial load (parallel to the close nipple 19). The second thrust bearing 4 permits rotation between the spacer 13 and the adaptor 2 and/or the sleeve bearing 3.

The tee 20 is configured to receive one or more attachments. For example, FIG. 3 depicts a counterweight 21 and a navigation light 22 attached to the tee 20. The tee 20 is also attached to the close nipple 19, and as such can experience a braking force applied to the close nipple 19 by the brake disc 12.

The navigation light 22 can include a pipe of a size and strength to suspend a lamp below a rotational center of the brake disc 12 and at a length as measured from a rotational center of the brake disc 12 to a focal plane of a lens of the lamp. For example, the length from the rotational center of the brake disc 12 to the focal plane of the lens can be 6 foot 3 inches, 4 foot 10 inches, 5 foot 2 inches, or another length as can be appreciated. The counterweight 21 can include a pipe of size and strength for suspending one or more weights (not shown) from the rotational center of the brake disc 12. The one or more weights can be sufficient to offset a weight of the navigation light 22 while the navigation light 22 is being pivoted toward a service, operating, or hold position.

The device 200 can be locked into place using the lock 15. The lock 15 secures the brake pin 9 via the brake pin retainer 14 to prevent unwanted operation of the device 200. For example, the device 200 can be locked when the navigation light 22 has been lowered into an operating position. Unlocking the lock 15 allows the first end 9a of the brake pin 9 to be released from the brake pin retainer 14. As depicted, the brake pin 9 extends from the first end 9a near the brake pin retainer 14, through an opening of the pipe cap 6 and into the brake pipe 7, and the second end 9b of the brake pin 9 emerges through the brake pin guide 11.

The brake disc 12 can have indentations 12a or other connection elements that can receive the second end 9b of the brake pin 9 to prevent the brake disc 12 from rotating. As depicted for example, the second end 9b of the brake pin 9 can be inserted into an indentation 12a of the brake disc 12 to prevent the brake disc 12 from causing the navigation light 22 to move out of an operating, service, or hold position. The brake pin guide 11 can guide the second end 9b of the brake pin 9 into one of the indentations 12a on the brake disc 12. The pipe support 10 supports the brake pipe 7 so that the brake pin 9 can align with the brake pin guide 11. In this way, the navigation light 22 can be secured from moving.

In operation, the first end 9a of the brake pin 9 can be lifted up to cause the second end 9b of the brake pin 9 to be removed from the indentation 12a of the brake disc 12 and to allow the brake disc 12 the freedom to rotate. To move the navigation light 22 to a service or hold position, an operator can apply a force to the counterweight 21, the navigation light 22, or both. The device 200 is configured to allow the force to be applied from either side, such as to pivot the navigation light 22 in a clockwise or a counterclockwise direction. Applying the force to the counterweight 21, for example, allows the navigation light 22 to pivot about the rotational center of the brake disc 12. As there is a weight to the counterweight 21, a respective weight of the navigation light 22 can be offset, allowing an operator to easily move the navigation light 22 into a service or hold position. The service or hold position can, for example, be about 90 or 120 degrees from vertical. In other embodiments, the hold position can be between about 90 degrees and 180 degrees from a horizontal surface of the structure 104. Various operations of the device 200 are described in the methods and figures that follow.

Figure 4:
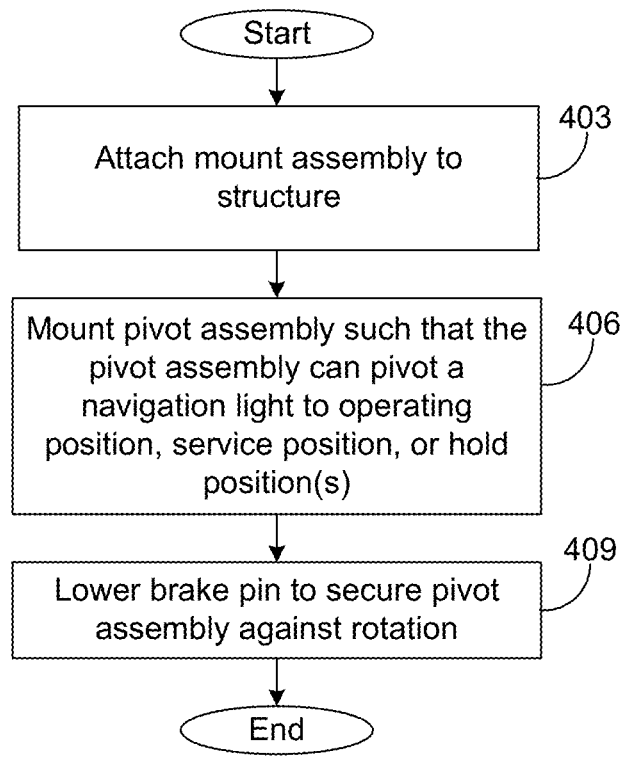
FIG. 4 is a flowchart illustrating one example method of pivoting a navigation light, in accordance with various embodiments of the present disclosure.
Figure 4:
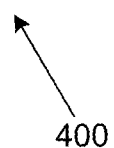

Referring now to FIG. 4, depicted is a flowchart illustrating one example method 400 of pivoting a navigation light 22. Although the method 400 in FIG. 4 is described below as being conducted using the device 200 shown in FIGS. 2 and 3, other devices similar to the device 200 can be used. The method 400 begins at step 403 by attaching an attachment such as a mount plate 1, other element of the mount assembly 202, or other element of the device 200 to a structure 104. The method 400 continues at step 406 by mounting a pivot assembly 204 to the mount assembly 202 such that the pivot assembly 204 can pivot the navigation light 22 to one or more operating, service, or hold position (s). The pivot assembly 204 can include a brake disc 12 with an indentation 12a for accommodating the second end 9b of the brake pin 9.

At step 409, the method 400 can include obtaining a brake pin 9 having two opposing ends, for example a first end 9a and a second end 9b distal from the first end 9a. The method 400 can include lowering the brake pin 9 to secure the pivot assembly 204 against rotation when the second end 9b of the brake pin 9, or at least a portion of the brake pin 9, is accommodated by the at least one indentation 12a. In some examples, the method 400 includes capturing the first end 9a of the brake pin 9 to prevent unwanted pivoting of the navigation light 22. The method 400 can also include attaching a counterweight 21 and the navigation light 22 to the tee 20 or other element of the pivot assembly 204. Thereafter the method can end.

Figure 5:
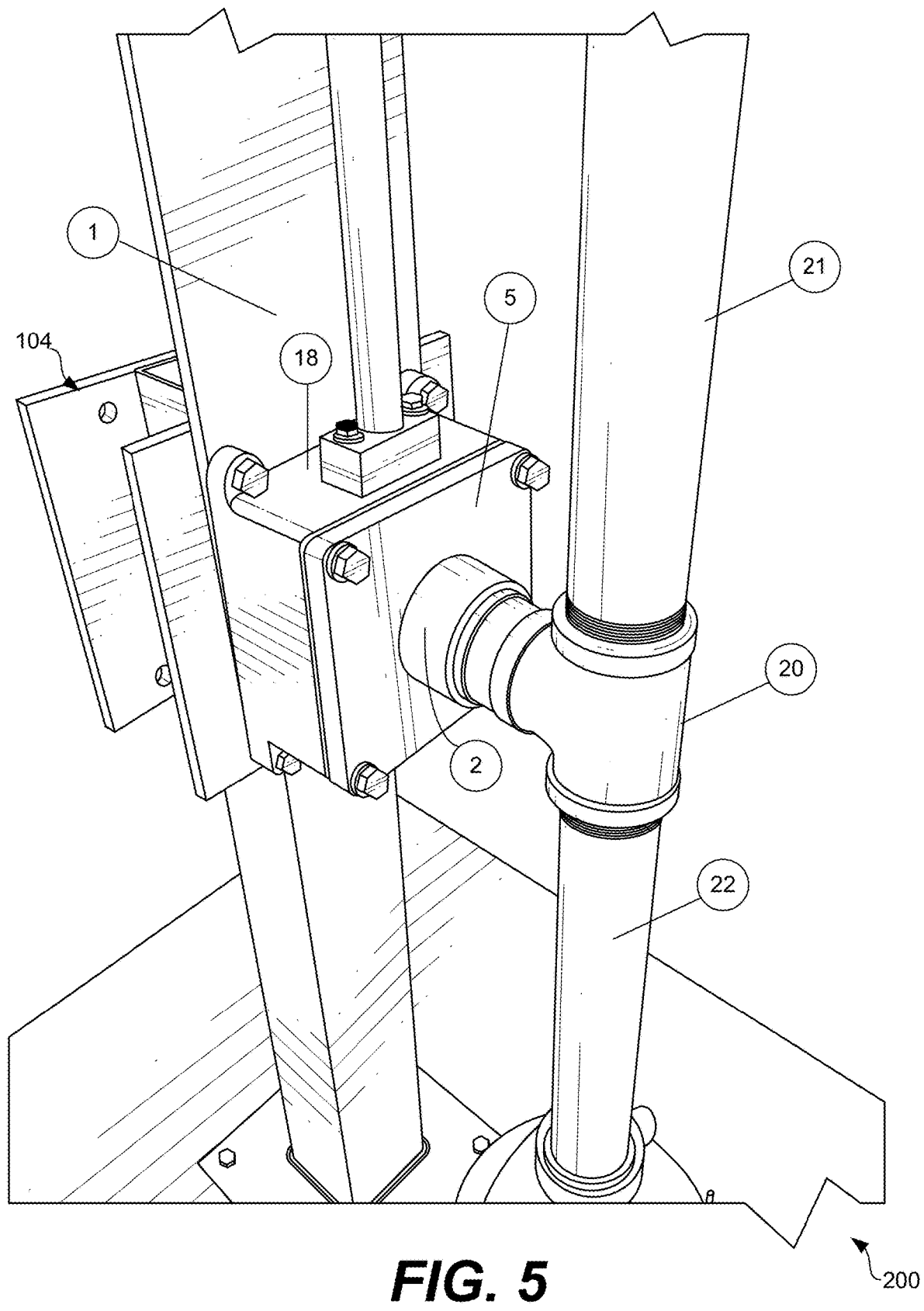
FIG. 5 illustrates an example of a device for pivoting a navigation light in an operating position, in accordance with various embodiments of the present disclosure.

Turning now to FIG. 5, shown is an example of a device 200 for pivoting a navigation light 22. The mount plate 1 has attached the device 200 to a structure that is representative of the structure 104. The device 200 depicted is locked into place with the navigation light 22 lowered into an operating position below a platform of the structure 104. The adaptor 2 is mounted for rotation in a sleeve bearing 3 (FIG. 3) which is mounted to the cover 5. The adaptor 2 and the tee 20 are mechanically coupled. The counterweight 21 and the navigation light 22 have also been fastened to the tee 20. The cover 5 has been removably attached to the box 18. Not depicted is that the brake pin 9 has been lowered into an indentation 12a of the brake disc 12, thus preventing the navigation light 22 from moving from the operating position.

Figure 6:
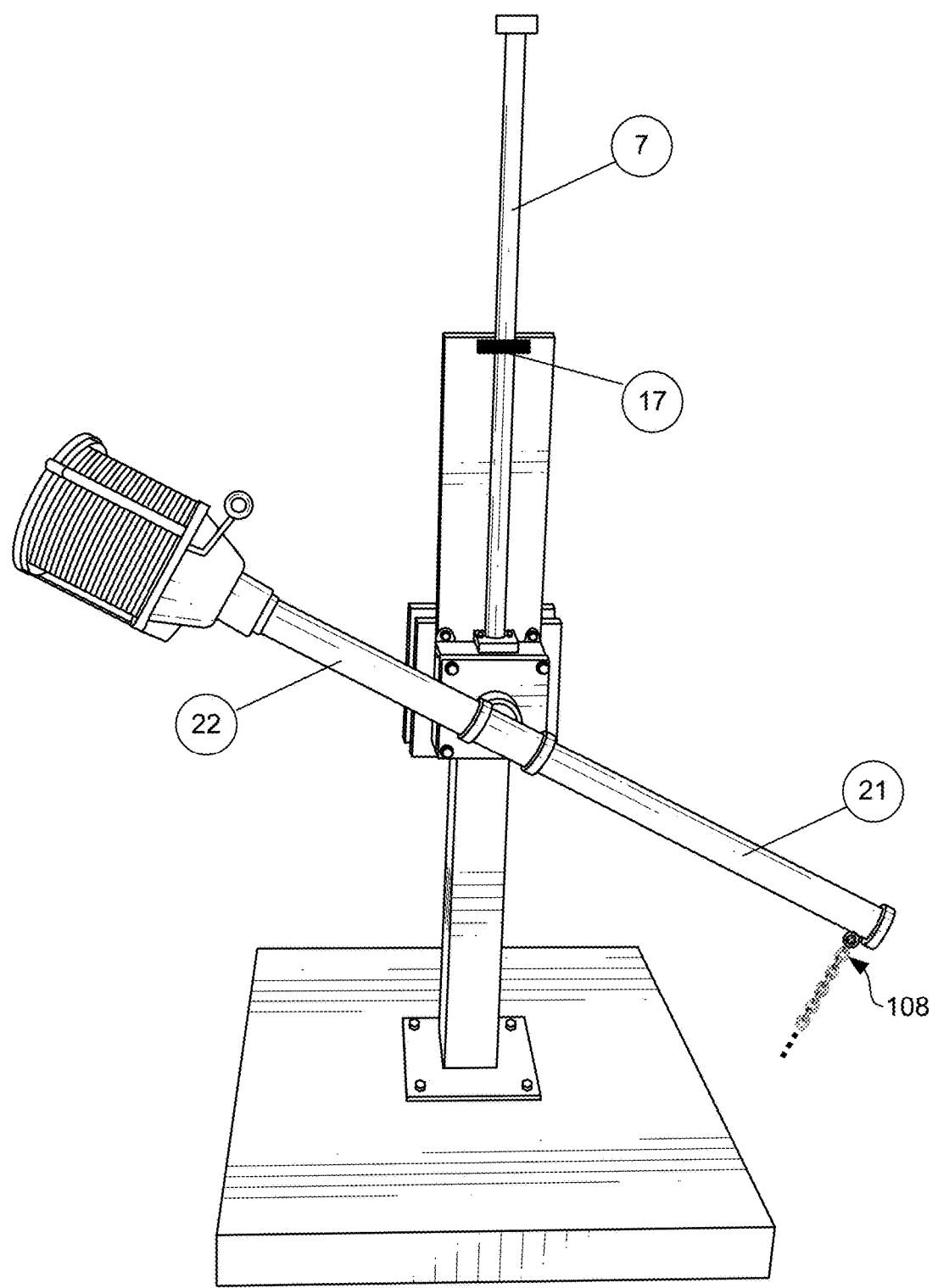
FIG. 6 illustrates an example of a device for pivoting a navigation light in a service or hold position, in accordance with various embodiments of the present disclosure.

FIG. 6 illustrates an example of a device 200 for pivoting a navigation light 22 in a service or hold position. In this example, the navigation light 22 has been allowed to pivot about the rotational center of the brake disc 12 (FIG. 3). The respective weight of the navigation light 22 has been offset by the weight of the counterweight 21. The pipe strap 17 secures the brake pipe 7 or other tube in position. As described with respect to FIG. 3, the brake pin 9 passes within the brake pipe 7 such that the second end 9b of the brake pin 9, or at least a portion of the brake pin 9, emerges from the brake pipe 7. In some examples, the brake pin 9 contacts the brake disc 12, and an application of a substantially upward force to the brake pin releases the brake pin from the contact with the disc. In some other examples, the first end 9a of the brake pin 9 is lowered to allow one of the indentations 12a of the brake disc 12 to accommodate the second end 9b of the brake pin 9. The device 200 is depicted with a retrieval chain 108 attached to the counterweight 21.

Figure 7:
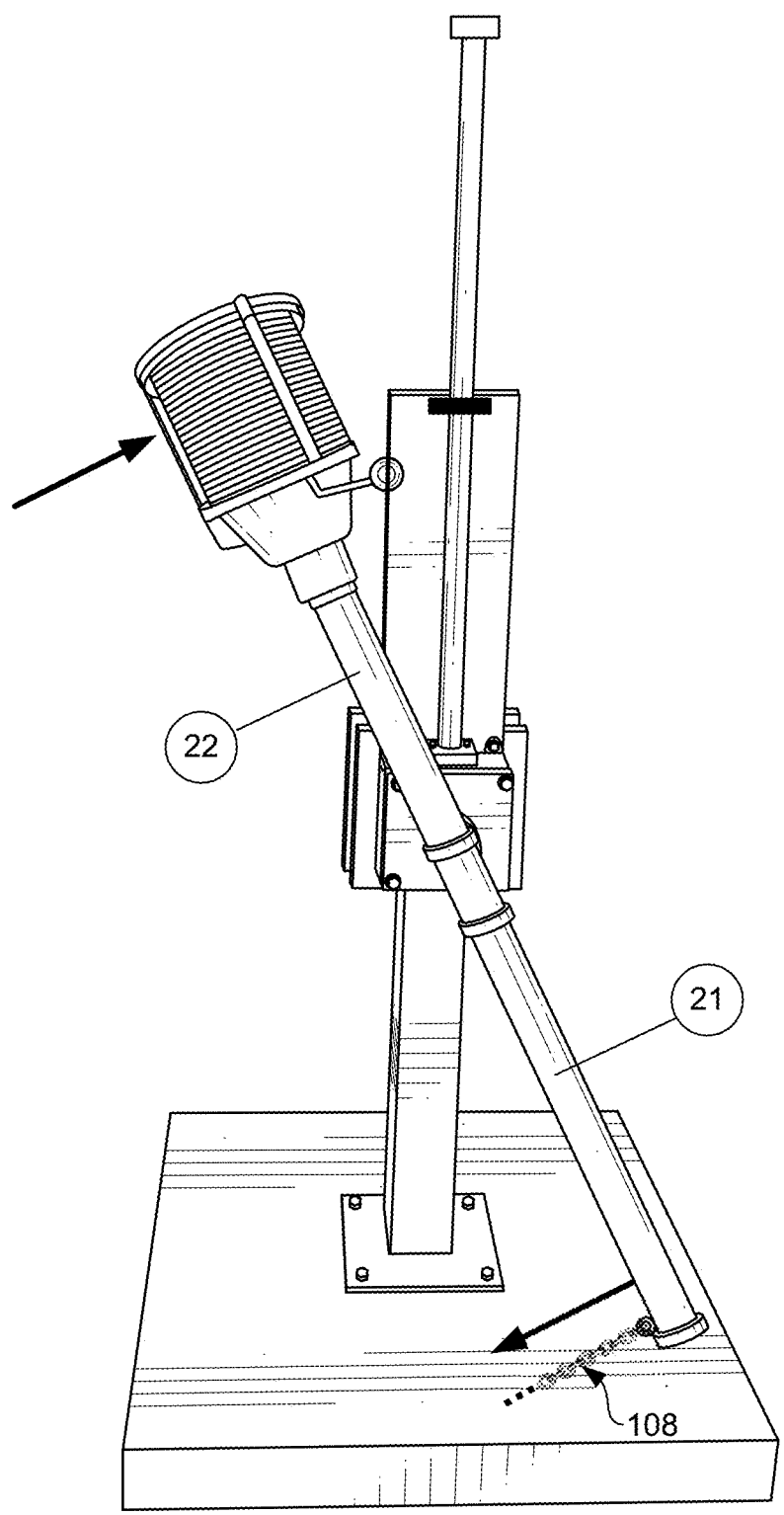
FIG. 7 illustrates an example of a device for pivoting a navigation light in a service or hold position, in accordance with various embodiments of the present disclosure.

FIG. 7 illustrates an example of a device 200 for pivoting a navigation light 22 in a service or hold position. Continuing the example of FIG. 6, an operator has applied an upward force to the first end 9a of the brake pin 9 to remove the second end 9b from the indentation 12a and allow the navigation light 22 to be pivoted. The operator can apply a force (indicated by arrows) to the navigation light 22 or the counterweight 21 to pivot the navigation light 22 toward a vertical position. For example, the operator can use the retrieval chain 108 to apply the force to the counterweight 21 to pivot the navigation light 22 toward the vertical position.

Figure 8:
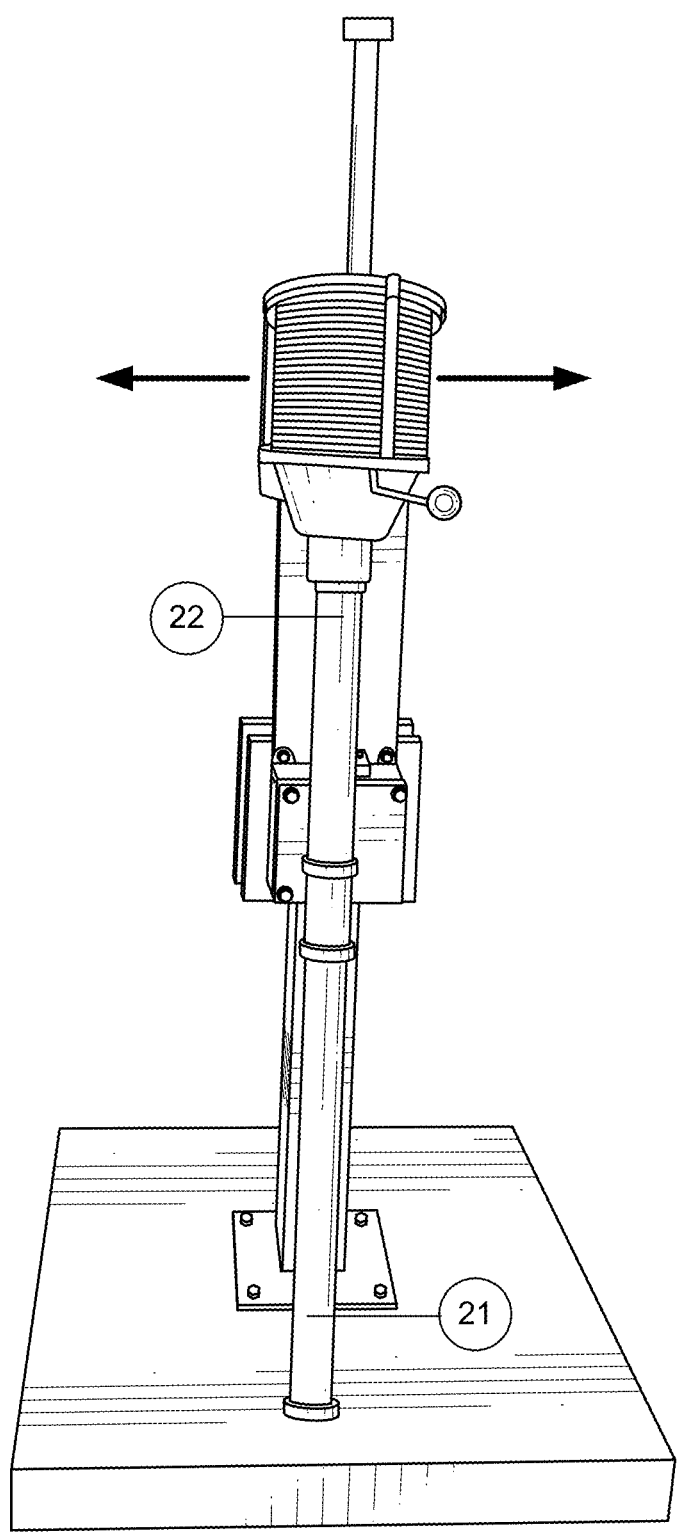
FIG. 8 illustrates an example of a device for pivoting a navigation light in a service or hold position, in accordance with various embodiments of the present disclosure.

FIG. 8 illustrates an example of a device 200 for pivoting a navigation light 22 in a service or hold position, in accordance with various embodiments of the present disclosure. Continuing with the example of FIGS. 6 and 7, the device 200 has allowed the navigation light 22 to pivot until the navigation light 22 has reached a vertical position. At this point, an operator may desire to lower the brake pin 9 to secure the device 200 (or the navigation light 22) against rotation. Or, the operator can easily pivot the navigation light 22, in either direction as indicated by the arrows, toward an operating position.

Figure 9:
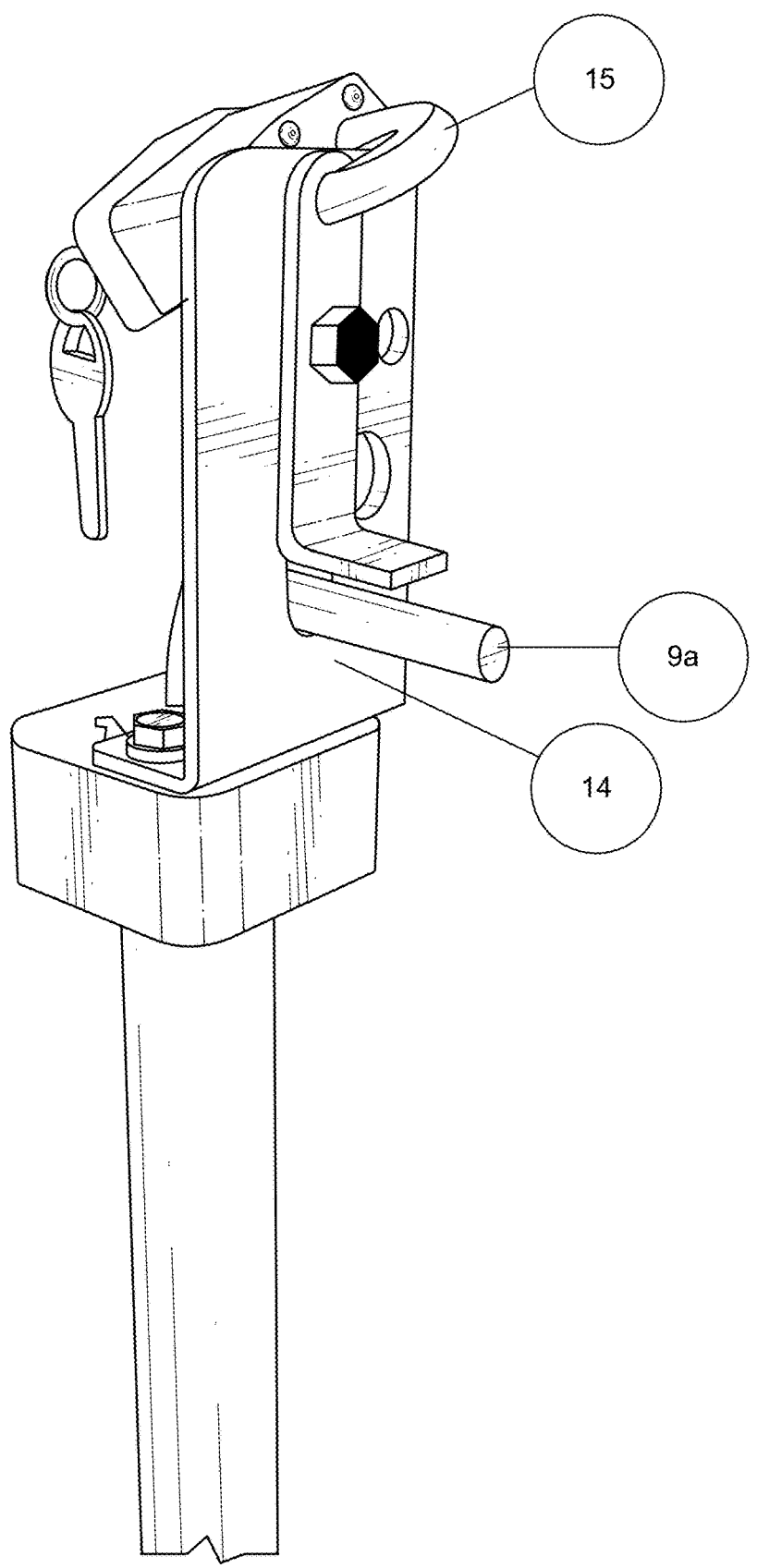
FIG. 9 illustrates an example of a brake pin retainer of a device for pivoting a navigation light, in accordance with various embodiments of the present disclosure.

FIG. 9 illustrates an example of a brake pin retainer 14 of a device 200 for pivoting a navigation light 22. FIG. 9 depicts that the lock 15 secures the brake pin retainer 14 in place. The brake pin retainer 14 has captured the first end 9a of the brake pin 9 so that the brake pin 9 cannot be lifted up or the second end 9b of the brake pin 9 remains inserted into an indentation 12a of the brake disc 12, preventing unwanted operation of the device 200. The example of FIG. 9 depicts that the device 200 can be locked into an operating position where the navigation light 22 has been lowered below the platform of the structure 104. The device 200 can also include a top enclosure to enclose the first end 9a of the brake pin 9.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims. In addition, all optional and preferred features and modifications of the described embodiments and dependent claims are usable in all aspects of the disclosure taught herein. Furthermore, the individual features of the dependent claims, as well as all optional and preferred features and modifications of the described embodiments are combinable and interchangeable with one another.

The device 200 can be formed from any suitable type(s) of materials to meet or exceed U.S. Coast Guard Bridge Administration General Construction Requirements and/or other design specifications. The device 200 can be assembled by hand, or by machine, from aluminum or bronze castings combined with stainless steel hardware, from galvanized steel, or in other ways as can be appreciated. As the device 200 can be configured to raise or lower a light in a marine environment, the device 200 can include gaskets and o-rings to provide a weather-tight assembly. Also, the device 200 can be represented by a BIMobject® object information or file that can be manipulated by a computer-aided design program.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present invention defined in the following claims, the scope of which are to be accorded the broadest interpretation so as to encompass modifications and equivalent structures.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

The term "substantially" is meant to permit deviations from the descriptive term that don't negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, the following is claimed:

1. A device for pivoting a navigation light, comprising:
a mount assembly comprising an attachment for attaching the device to a structure;
a pivot assembly supported by the mount assembly, the pivot assembly being configured to pivot a navigation light to at least one of: an operating position, a service position, or a hold position; and
a brake assembly comprising a brake pin having a first end and a second end distal from the first end, the second end of the brake pin being sized and shaped to fit within an indentation of a disc of the pivot assembly to secure the pivot assembly against rotation when the second end is accommodated by the indentation,
wherein applying an upward force to the first end of the brake pin removes the second end from the indentation and allows the navigation light to be pivoted to the at least one of: the operating position, the service position, or the hold position.

2. The device according to claim 1, wherein the indentation comprises a plurality of indentations that are equidistantly spaced in a radial pattern from a center point of the disc.

3. The device according to claim 2, wherein the hold position comprises a plurality of hold positions corresponding to the plurality of indentations.

4. The device according to claim 3, wherein accommodating the second end by one of the plurality of indentations secures the navigation light in a corresponding one of the hold positions.

5. The device according to claim 1, wherein the pivot assembly further comprises a tee sized and shaped to receive and secure the navigation light.

6. The device according to claim 1, wherein the pivot assembly further comprises a counterweight that offsets at least a portion of a weight of the navigation light in the at least one of: the service position or the hold position.

7. The device according to claim 1, further comprising a brake pin guide configured to align the second end of the brake pin to be received by the indentation.

8. The device according to claim 1, wherein the brake assembly further comprises a lock mechanism comprising a brake pin retainer that captures the brake pin when locked.

9. A device for pivoting a navigation light, comprising:
a mount assembly comprising a tube and a sleeve;
a pivot assembly comprising a disc connected to a shaft, the shaft being supported by the sleeve to allow the shaft to rotate about a rotational center of the disc; and
a brake assembly comprising a brake pin that is configured to pass within the tube, at least a portion of the brake pin emerging from the tube to contact the disc, and an application of a substantially upward force to the brake pin releases the brake pin from the contact with the disc.

10. The device according to claim 9, wherein the brake pin passes within the tube for at least three feet.

11. The device according to claim 9, wherein the shaft connects to a tee having a first end sized and shaped to receive and secure a navigation light and a second end sized and shaped to receive and secure a counterweight.

12. The device according to claim 11, wherein applying a force to the counterweight pivots the navigation light about the rotational center of the disc.

13. The device according to claim 11, wherein the brake pin contacting the disc secures the navigation light in a plurality of positions that are equidistantly spaced in a radial pattern from a center of the disc.

14. A method of pivoting a navigation light, comprising:
attaching a mount assembly to a structure;
supporting a pivot assembly by the mount assembly, the pivot assembly being configured to pivot a navigation light to at least one of: an operating position, a service position, or a hold position, and the pivot assembly comprising a disc having an indentation;
obtaining a brake assembly comprising a brake pin having a first end and a second end distal from the first end, the second end of the brake pin being sized and shaped to fit within the indention of the disc of the pivot assembly to secure the pivot assembly against rotation when the second end is accommodated by the indention;
lowering a brake pin to secure the pivot assembly against rotation when the second end of the brake pin is accommodated by the indentation; and
applying an upward force to the brake pin to allow the navigation light to be pivoted to the at least one of: the operating position, the service position, or the hold position when the second end of the brake pin is removed from the indentation.

15. The method of claim 14, wherein the hold position is between about 90 degrees and about 180 degrees from a horizontal surface of the structure.

16. The method of claim 14, further comprising attaching a counterweight and the navigation light to the pivot assembly.

17. The method of claim 16, wherein applying a force to the counterweight pivots the navigation light about a rotational center of the disc.

18. The method of claim 14, further comprising capturing the brake pin to prevent unwanted pivoting of the navigation light.

19. The method of claim 14, wherein the mount assembly comprises a tube and a sleeve, the brake pin is configured to pass within the tube and at least a portion of the brake pin emerges from the tube to contact the disc.

20. The method of claim 14, wherein the disc is connected to a shaft of the pivot assembly, and the shaft is supported by the sleeve to allow the shaft to rotate about a rotational center of the disc.

\* \* \* \* \*